US007012044B2

(12) United States Patent
Dawson et al.

(10) Patent No.: US 7,012,044 B2
(45) Date of Patent: *Mar. 14, 2006

(54) OIL AND GAS RECOVERY FROM SUBTERRANEAN FORMATIONS

(75) Inventors: Jeffrey C. Dawson, Spring, TX (US); Hoang Van Le, Houston, TX (US); Subramanian Kesavan, The Woodlands, TX (US)

(73) Assignee: BJ Services Company, Houston, TX (US)

( * ) Notice: Subject to any disclaimer, the term of this patent is extended or adjusted under 35 U.S.C. 154(b) by 47 days.

This patent is subject to a terminal disclaimer.

(21) Appl. No.: 10/655,907

(22) Filed: Sep. 5, 2003

(65) Prior Publication Data

US 2004/0048750 A1 Mar. 11, 2004

Related U.S. Application Data

(63) Continuation of application No. 09/784,695, filed on Feb. 15, 2001, now Pat. No. 6,649,572, which is a continuation of application No. 09/454,687, filed on Dec. 3, 1999, now Pat. No. 6,383,990, which is a continuation of application No. 09/191,336, filed on Nov. 13, 1998, now Pat. No. 6,017,855, which is a continuation of application No. 08/864,007, filed on May 27, 1997, now abandoned.

(51) Int. Cl.
*E21B 43/26* (2006.01)
*C09K 3/00* (2006.01)

(52) U.S. Cl. ............... 507/211; 507/209; 507/240; 507/271; 507/903; 507/922; 166/308.2; 166/308.3; 166/308.5

(58) Field of Classification Search ............... 507/209, 507/211, 240, 271, 903, 922; 166/308.1–308.6
See application file for complete search history.

(56) References Cited

U.S. PATENT DOCUMENTS

| | | |
|---|---|---|
| 2,761,843 A | 9/1956 | Brown |
| 4,336,145 A | 6/1982 | Briscoe |
| 4,428,432 A | 1/1984 | Pabley |
| 4,462,917 A | 7/1984 | Conway |
| 4,477,360 A | 10/1984 | Almond |
| 4,487,867 A | 12/1984 | Almond et al. |
| 4,488,975 A | 12/1984 | Almond |
| 4,505,826 A | 3/1985 | Horton |
| 4,553,601 A | 11/1985 | Almond et al. |
| 4,578,488 A | 3/1986 | Rummo et al. |
| 4,604,217 A | 8/1986 | Lukach et al. |
| 4,635,727 A | 1/1987 | Anderson et al. |
| 4,799,550 A | 1/1989 | Harris et al. |
| 4,977,962 A | 12/1990 | Himes et al. |
| 5,036,136 A | 7/1991 | Peiffer |
| 5,093,448 A | 3/1992 | Peiffer |
| 5,152,906 A | 10/1992 | Aften et al. |
| 5,305,832 A | 4/1994 | Gupta et al. |
| 5,566,760 A | 10/1996 | Harris |
| 5,614,475 A | 3/1997 | Moorhouse et al. |
| 5,681,796 A | 10/1997 | Nimerick |
| 5,681,797 A | 10/1997 | Lawate |
| 5,697,444 A | 12/1997 | Moorhouse et al. |
| 5,944,106 A | 8/1999 | Dalrymple |
| 5,972,850 A | 10/1999 | Nimerick |
| 6,017,855 A | 1/2000 | Dawson et al. |
| 6,383,990 B1 | 5/2002 | Dawson et al. |
| 6,649,572 B1 * | 11/2003 | Dawson et al. ............. 507/209 |

FOREIGN PATENT DOCUMENTS

WO    WO 98/54272    12/1998

OTHER PUBLICATIONS

Simha et al. "Compression of Felxible Chain Molecules in Solution" *Journal of Chemical Physics* (1960) 33:1791-1793.
Graessley, William W. "The Entanglement Concept in Polymer Rheology" *Advances in Polymer Science* (1974) 16:40-43.
DeGennes, P.D. "Dynamics of Entangled Polymer Solutions" *Macromolcules* (1976) 9(4):587-593.
Adam et al. "Dynamical Properties of Polymer Solutions in Good Solvent by Rayleigh Scattering Experiments" *Macromolecules* (1977) 10(6):1229-1237.
Ferry, John D. "Viscoelastic Properties of Polymers", Sep., 1980, pp. 212-213.
Robinson, et al. "Viscosity-Molecular Weight Relationships, Intrinsic Chain Flexibility, and Dynamic Solution Properties of Guar Galactomannan" *Carbohydrate Research* (1982) 107:17-32.
API Rheological Characterization of Fracturing Fluids, Frac Project 84-45, Dec., 1984.
Almond, S.W. et al. "High-Efficiency Fracturing Fluids for Low-Temperature Reservoirs" *SPE 13617*, SPE 1985 California Regional Meeting, pp. 275-283 (1985).
Menjivar, Juan A. "Use of Gelation Theory to Characterize Metal Cross-Linked Polymer Gels" *Advances in Chemistry Series* (1986) 213:209-226.
Zasadzinski, Joseph et al.Transmission Electron Microscopy of Gel Network Morphology Relating Network Microstructure to Mechanical Properties, Macromolecules, vol. 19, No. 12, pp. 2960-2964, 1986.

(Continued)

Primary Examiner—Philip C. Tucker
(74) *Attorney, Agent, or Firm*—Brinks, Hofer, Gilson & Lione

(57) ABSTRACT

Methods are provided for fracturing subterranean formations using fluids having substantially reduced polymer loadings that have performance equivalent to conventional fluids. Reduced polymer loadings provide significant advantages such as reduced treatment costs and less damage to the fracture sand pack and surrounding subterranean formations.

33 Claims, No Drawings

OTHER PUBLICATIONS

Watts, Mike and Harms, Weldon, "Deep Hot Wells Can Be Effectively Fracture Stimulated", *Petroleum Engineer International*, Mar., 1991.

Hunter, Jeff and Walker, Jr., Ray N., "Cleaner Frac Fluids Improve Load Recovery and Tight-Gas Well Production", *World Oil*, Oct., 1991.

Broadhead, R.F. et al. "ABO Fluvial/Deltaic Sandstone" *Atlas of Major Rocky Mountain Gas Reservoirs*, New Mexico Bureau of Mines & Mineral Resources (1993).

Kesavan, S. "Rheology of Aqueous Gels" Dissertation, Princeton University, Jan. 5, 1994.

Notebook No. SK1 issued to S. Kesavan on Jun. 6, 1995.

BJ Services Company Treatment Report dated Jan. 18, 1996.

BJ Services Company Treatment Report dated Mar. 18, 1996.

BJ Services Company Treatment Report dated Mar. 18, 1996, Bates No. BJS 132472.

BJ Services Company Treatment Report dated Mar. 19, 1996.

BJ Services Company Treatment Report dated Mar. 20, 1996.

BJ Services Company CMG, GW-38 Presentation prepared by Rhone Poulenc, Inc., dated Sep. 30, 1996.

P.C. Harris, SPE and S.J. Heath, Rheological Properties of Low-Gel Loading Borate Frac Gels, Annual Technical Conference and Exhibition, p. 1-15 (Oct. 5-8, 1997).

Defendant Halliburton Energy Services, Inc.'s First Amended Answer, Defenses, and Counterclaims, Mar. 19, 2001.

Plaintiff BJ Services' Reply to Halliburton Energy Services, Inc.'s First Amended Counterclaim, Apr. 27, 2001.

* cited by examiner

OIL AND GAS RECOVERY FROM SUBTERRANEAN FORMATIONS

CROSS REFERENCE TO RELATED APPLICATIONS

This application is a continuation of U.S. patent application Ser. No. 09/784,695, filed Feb. 15, 2001, now U.S. Pat. No. 6,649,572; which is a continuation of U.S. patent application Ser. No. 09/454,687, filed Dec. 3, 1999, now issued as U.S. Pat. No. 6,383,990 B1; which was a continuation of U.S. patent application Ser. No. 09/191,336, filed Nov. 13, 1998, now issued as U.S. Pat. No. 6,017,855, which was a continuation of U.S. patent application Ser. No. 08/864,007, filed May 27, 1997, now abandoned. All of the above-referenced applications are incorporated herein by reference.

BACKGROUND OF THE INVENTION

Production of oil and gas from subterranean formations is dependent on many factors. These hydrocarbons must usually migrate through a low permeable formation matrix to drain into the wellbore. In many formations, the permeability is so low that it hinders the well's production rate and overall potential. In other wells, the near wellbore is damaged during drilling operations and such damage often results in less than desirable well productivity. Hydraulic fracturing is a process designed to enhance the productivity of oil and gas wells or to improve the injectivity of injection wells.

In the fracturing process, a viscous fluid is injected into the wellbore at such a rate and pressure as to induce a crack or fracture in the formation. Once the fracture is initiated, a propping agent, such as sand, is added to the fluid just prior to entering the wellbore. This sand laden slurry is continuously injected causing the fracture to propagate or extend. After the desired amount of proppant has been placed in the reservoir, pumping is terminated, and the well is shut-in for some period of time. Later, the well is opened, initially to recover a portion of the treating fluid and later the hydrocarbons. The hydraulic fracturing process is successful because the hydrocarbons are now able to drain into the propped fracture that serves as a highly conductive channel leading directly to the wellbore.

The fracturing treatment is dependent, in part, on the properties of the fracturing fluid. The fluid must attain high viscosities, minimize solvent loss to the formation matrix (known in the art as fluid loss control) and adequately suspend the proppant. The fracturing fluid is prepared by first dissolving polymers in a solvent. Generally, the solvent is water which is often made saline or contains other additives to minimize clay expansion and migration in the formation matrix. The fracturing fluids are typically composed of water soluble polymers, crosslinking agents, breakers and other additives, such as surfactants, which are employed to prevent well specific problems such as water blocks or emulsions.

The water soluble polymers most often used are either guar gum or a guar gum derivative. The derivatives usually are hydroxypropyl guar (HPG), carboxymethyl guar (CMG) or carboxymethylhydroxypropyl guar (CMHPG). Less often, cellulose derivatives such as hydroxyethyl cellulose (HEC) or carboxymethylhydroxypropyl cellulose are used, but are generally cost prohibitive. Lastly, biopolymers such as xanthan gum have been used in rare occasions. At polymer concentrations usually ranging from 0.24 to 0.72 weight percent, the viscosities of the solutions made from these polymers are too low in most instances to be used as a fracturing fluid. As a reference, a 0.48 weight percent polymer solution (i.e. without a crosslinking agent) generally provides a viscosity of less than 50 centipoise (cps) at 511 $s^{-1}$. The viscosity of polymer solutions may be enhanced by the addition of a crosslinking agent. Typical crosslinking agents contain titanium, zirconium or boron ions. These agents work by binding the polymer chains together. Since the viscosity is derived exponentially from the polymer's molecular size, binding the polymers together dramatically increases their size and consequently, the viscosity.

Traditionally, polymer concentration has been viewed as the important factor in obtaining fracturing fluid stability, i.e. maintenance of viscosity at an acceptable level, at a prescribed temperature, for a defined period of time. The convention in the art has been to increase polymer concentration or loading to increase stability for long pumping times or for treating formations at high temperatures. For example, in wells having high temperatures in excess of about 350° F. (177° C.), the polymer loading may exceed 0.72 weight percent. At the other extreme, a useful fracturing fluid could not be obtained at polymer concentrations of less than 20 pounds per thousand gallons (ppt), or 0.24 weight percent. In practice, an increase in viscosity above the polymer solution is not obtained and many times the polymer may precipitate to from solution when crosslinker is added. However, it would be highly desirable to have stable, crosslinked fracturing fluids using polymer loadings of 20 ppt less.

SUMMARY OF THE INVENTION

The surprising discovery has been made that crosslinked fracturing fluids having substantially reduced polymer loadings can be made that have performance equivalent to conventional crosslinked fracturing fluids. The fluids of the present invention include modified polymers having randomly distributed anionic substituents which yield high viscosity. The modified polymers may be crosslinked with suitable crosslinking agents to form viscous gels that are stable at polymer concentrations as low as 0.12 weight percent. The fluids of this invention provide many advantages in that equivalent fracturing fluid performance may be obtained at reduced overall treatment costs. Reduced polymer loadings may also result in less damage to the fracture sand pack and the surrounding subterranean formation after the fracturing treatment.

BRIEF DESCRIPTION OF THE DRAWINGS

Not applicable.

DESCRIPTION OF EMBODIMENTS OF THE INVENTION

The invention described below is a modified hydraulic fracturing fluid and method of its use to stimulate oil and gas wells. Fracturing fluids are conventionally made of water soluble polymers which are crosslinked in order to produce sufficient viscosity to create a fracture and to place a propping agent into the created fracture. To serve these functions properly, it is believed in the art that the fluid must maintain a critical minimum viscosity. Fracturing fluid systems have been developed so that the critical minimum viscosity is maintained for various time periods at various temperatures. Generally, fluids with viscosity values exceeding 100 cps at 105 sect are thought to be adequate for fracturing wells. It is desirable for all of the fracturing fluid to be pumped into the formation before the viscosity of the is initially pumped fluid reaches that minimum. To obtain such performance, fracturing fluid systems normally contain polymer concentrations greater than the C* concentration for the polymer.

The C* concentration is described as that concentration necessary to cause polymer chain overlap. Suitable polymer chain overlap to effectively obtain a crosslinked gel is thought to occur when polymer concentration exceeds the C* concentration. In fact, the higher the polymer concentration, the greater the polymer chain overlap and the greater the gel strength after crosslinking. The literature often recites the C* concentration for guar to be about 0.19 to 0.22 weight percent polymer. Consequently, the lowest concentration of polymer typically used in hydraulic fracturing applications to form crosslinked gels has been about 0.24 weight percent or 20 pounds per thousand gallons (ppt). However, such gels typically have very limited stability at the temperatures frequently encountered in fracturing applications.

CMG and CMHPG contain carboxylate groups which are anionically charged except in strong acid. These anionically charged groups tend to repel away from one another. Because they are chemically bound to the polymer, repulsion of the anionic groups also causes the polymer to occupy a much larger volume than the unsubstituted guar polymer. Surprisingly, it has been found that some carboxylated guar derivatives have C* values as low as 0.06 weight percent. These polymers were found to make suitable crosslinked gels that were applicable for hydraulic fracturing processes at concentrations as low as 0.12 weight percent or 10 ppt. Although previously such fluids were not stable at temperatures higher than ambient, it has surprisingly been discovered that polymer loadings of about 0.14 weight percent are stable up to 150° F. (65° C.) and useful gels with stability up to 175° F. (79° C.) can be made with as little as 0.18 weight percent polymer or 15 ppt.

The invention described herein has several advantages. Lower loadings of polymer can be used to obtain equivalent fracturing fluid performance at reduced overall treatment costs. Reduced polymer loadings may also result in less damage to the surrounding subterranean formation after the fracturing treatment. Guar based polymers are attributed with causing damage to both the fracture sand pack and reducing the effective fracture width. The present invention permits substantial reduction in the amount of polymer injected into the formation while maintaining optimal fluid properties for creating the fracture.

Reducing the C* concentration for a polymer requires modification of the conventional guar polymers. In the practice of the present invention it is preferred that the guar polymer is high yielding. High yielding guar polymers can be obtained in many ways, including a) using premium grade guar as the starting material to which anionic groups are chemically added; and/or b) selecting processing parameters that provide better uniformity in placing the anionic substituents on the guar polymer backbone; and/or c) additional processing steps, including ultrawashing to remove impurities and refine the polymer. While using premium grade guar as the starting material is one way to obtain high yielding polymers in accordance with this invention, their use is not essential. The preferred polymers in accordance with the present invention are high yielding guars having randomly distributed anionic substituents. The most preferred polymers are high yielding guars having randomly substituted carboxymethyl substituents, for example CMG and CMHPG. Although CMG and CMHPG have been commercially available for a number of years, the conventional products have not been high yielding and in general do not produce the results described herein.

When forming the fracturing fluid, the polymer loading is most preferably in the range of about 0.12 to about 0.24 weight percent. The high yielding guar polymer is normally added to an aqueous fluid which may contain a variety of additives. Careful selection of additives must be made because the polymer has groups which are anionic and charge association by counter cations is possible. If cation groups are present, less charge repulsion between the anionic groups on the guar polymer will occur, resulting in less polymer chain expansion. Consequently, the present invention requires that certain cation producing additives, such as potassium chloride (KCl), a clay stabilizer, be excluded from the fracturing fluid. However, quaternary ammonium salts based on tetramethylammonium halides such as tetramethylammonium chloride (TMAC) can be used as a substitute. At relatively low loadings as little as 0.1 weight percent, TMAC is effective on clays without being detrimental to the fluids of the present invention. In forming the fracturing fluid of this invention, other conventional additives may be included, such as breakers, stabilizers, surfactants, among others well known to those skilled in the art. However, such additives should be selected so as not to interfere with the interactions of the anionic groups on the polymer.

Crosslinking is also an important part of the fracturing fluid. For the present invention, a suitable crosslinking agent is one which will increase the viscosity of the polymer solution by forming a complex with the anionic substituent on the polymer. Suitable crosslinkers include titanium, boron and zirconium based crosslinkers. Preferred crosslinkers include zirconium based compounds which will effectively form a complex with carboxylated polymers such as CMG or CMHPG. Preferred zirconium based crosslinkers include, zirconium lactate, zirconium glycolate and zirconium lactate triethanolamine. The most preferred zirconium based crosslinker is zirconium lactate.

When using zirconium based crosslinkers, the gelation kinetics are strongly dependent on the bicarbonate content of the aqueous fluid. Bicarbonate concentrations near 500 ppm often require fluid temperatures in excess of 140° F. (60° C.) to initiate full gelation. To overcome this temperature dependency, the fluid pH can be adjusted to about 5.0 or less to reduce the bicarbonate content. At a pH of about 5, gelation occurs within acceptable times at ambient temperature. For higher temperature applications, the presence of bicarbonate may be desirable in that it can be used to delay gelation temporarily, thereby increasing shear tolerance of the fluid during pumping. When using bicarbonate to delay gel formation, the fluid pH can be increased to exceed 9.0. The preferred pH range of the fluid was established by testing and found to be between about 3.5 and about 2.0. Gelation of the fluid at low pH allows pumping the gel with $CO_2$ for either gas assist or foam treatments. It is within the skill in the art to optimize the gelation kinetics by adjusting the pH and additives in the fluid.

The following examples are presented to show the utility of the invention and are not intended to limit the invention in any way.

EXAMPLE 1

In this experiment, 0.24 weight percent CMHPG is tested as a fracturing fluid at about 225° F. (107° C.). The fluid was prepared by adding 1.2 grams (20 ppt) of a high yielding CMHPG to 500 ml of tap water rapidly agitated and containing 0.5 ml of a 50 weight percent aqueous TMAC. After hydrating for about 30 minutes, the pH was adjusted to about 4.5 with glacial acetic acid. Afterward, with good agitation, 0.25 ml of a zirconium lactate crosslinking agent (8.5% $ZrO_2$) was added. Gelation occurred in about 90 seconds.

The gel was evaluated by pouring 45 grams of fluid into a Fann 50C cup. The Fann 50C bob and cup arrangement used an R1B5 geometry. The sample was placed on the rheometer and continuously sheared at 105 $s^{-1}$ for 120 seconds. A rate sweep followed using 105, 85, 63 and 42 $s^{-1}$ while measuring the resulting stress at each shear rate. These data were used to calculate the Power Law indices, n' and K' (dynes/$cm^2$), as defined in the American Petroleum Institute's (API) publication RP-39. After the rate sweep, the fluid was again sheared at 105 $s^{-1}$ while heating the sample to test temperature. The rate sweeps were repeated every 30 minutes and the interim rate between sweeps remained 105 $s^{-1}$.

Generally, fluids with viscosity values exceeding 100 cps at 105 $sec^{-1}$ are thought to be adequate for fracturing wells. It is desirable for all of the fracturing fluid to be pumped into the formation before the viscosity of the initially pumped fluid declines below 100 cps at 105 $s^{-1}$. Therefore, the pumping time is the time that the fluid viscosity exceeds the 100 cps criteria. In this experiment, the 0.24% polymer loading at low pH provided about 2 hours of pumping time. After 34 minutes, the fluid reached about 220° F. (104° C.) and obtained a viscosity of 498 cps at 105 $s^{-1}$ with an n' of 0.596 and K' of about 33 dynes/$cm^2$. After 124 minutes, the fluid retained 145 cps at 105 $s^{-1}$ with an n' of 0.561 and K' of about 11 dynes/$cm^2$. By 154 minutes, the viscosity reached 83 cps at 105 $s^{-1}$ with an n' of 0.534 and K' of about 7 dynes/$cm^2$

EXAMPLE 2

The experiment described in Example 1 was repeated except that the test temperature was reduced to about 200° F. (93° C.). These data, presented in Table 2, suggest that the pumping time at this temperature should exceed 6 hours.

TABLE 2

| TIME Min. | TEMP ° F. | n' | K' | 105 | 85 | 42 |
|---|---|---|---|---|---|---|
| 4 | 74 | .162 | 226.111 | 458 | 546 | 986 |
| 32 | 200 | .625 | 42.2913 | 738 | 799 | 1041 |
| 62 | 201 | .595 | 44.6013 | 677 | 738 | 982 |
| 92 | 201 | .6 | 39.2783 | 610 | 664 | 881 |
| 122 | 201 | .585 | 39.0282 | 566 | 618 | 827 |
| 152 | 201 | .569 | 37.6312 | 506 | 555 | 751 |
| 181 | 201 | .554 | 35.8215 | 449 | 494 | 676 |
| 211 | 201 | .565 | 30.529 | 403 | 442 | 601 |
| 241 | 201 | .576 | 25.8611 | 359 | 393 | 530 |
| 271 | 201 | .579 | 22.2305 | 313 | 343 | 461 |
| 301 | 201 | .585 | 19.2906 | 280 | 305 | 409 |
| 330 | 201 | .601 | 15.6728 | 245 | 266 | 353 |
| 360 | 93 | .535 | 33.172 | 381 | 420 | 583 |

EXAMPLE 3

The experiment in Example 1 was repeated except that polymer concentration and temperature reduced. The fluid was prepared by adding 0.9 grams (15 ppt) of a high yielding CMHPG to 500 ml of tap water rapidly agitated and containing 0.5 ml of a 50 weight percent aqueous TMAC. After hydrating for about 30 minutes, the pH was adjusted to about 4.5 with glacial acid. Afterward, with good agitation, 0.25 ml of a zirconium lactate crosslinking agent (8.5% $ZrO_2$) was added. Gelation occurred in about 60 seconds. The fluid was evaluated using the Fann 50C rheometer as described in Example 1 except that the test temperature was reduced to about 150° F. (65° C.). In this experiment, the pumping time for this fluid would exceed 16 hours. The fluid maintained viscosity of over 370 cps at 105 $s^{-1}$ for 16 hours. During the test period, n' ranged from about 0.75 to about 0.85 and K' decreased, but averaged about 12 dynes/cm2.

The fluid loss properties of the fluid of this example were tested. The excess fluid prepared above was used to fill a Baroid API high pressure fluid loss cell. The filtering membrane was three pieces of Baroid filter paper. The fluid was heated to 100° F. (37.8° C.) and pressurized to 1000 psi with $N_2$. The test started by opening the bottom stem and the filtrate volumes at corresponding times were recorded. The calculations were made as described in the API's RP-39. This test had a $C_{III}$ value of 0.0035 ft/$min^{1/2}$, a satisfactory value for a fracturing fluid. These data are shown in the Table below.

| TIME MINUTES | FLUID LOSS |
|---|---|
| 1 | 4.50 |
| 4 | 8.30 |
| 9 | 12.50 |
| 16 | 17.40 |
| 25 | 22.00 |
| 36 | 26.50 |

Cross Sectional Area = 22.8 $cm^2$
$C_{III}$ = 0.0035 ft/$min^{1/2}$
Spurt Loss = −0.0043 gal/$ft^2$

EXAMPLE 4

The experiment in Example 1 was repeated except that the polymer concentration and temperature were reduced. The fluid was prepared by adding 0.6 gram (10 ppt) of a high yielding CMHPG to 500 ml of tap water rapidly agitated and containing 0.5 ml of a 50 weight percent aqueous TMAC. After hydrating for about 30 minutes, the pH was adjusted to about 4.5 with glacial acetic acid. Afterward, with good agitation, 0.15 ml of a zirconium lactate crosslinking agent (8.5% $ZrO_2$) was added causing gelation to occur in about 60 seconds. The fluid was evaluated using the Fann 50C rheometer as described in Example 1 except that the test temperature was reduced to about 125° F. (52° C.). The pumping time for this 10 ppt polymer loading was about 2 hours. The fluid maintained an average viscosity of about 109 cps at 105 $s^{-1}$ at test temperature for about two hours. The average n' was 0.771 and K' averaged about 3 dynes/cm2.

EXAMPLE 5

Example 4 was repeated except that the Fann 50C test temperature was further reduced to about 100° F. (37.8° C.). In this experiment, the pumping time again exceeded 2 hours suggesting that fracturing fluids can be prepared using ultra low loading of polymer. The fluid maintained an average viscosity of about 127 cps at 105 $s^{-1}$ at test temperature with an average n' of about 0.797 and K' of about 3.3 dynes/cm2.

In this experiment, high yielding CMG was substituted for CMHPG. The fluid was prepared by adding 0.9 gram (15 ppt) of a high yielding CMG to 500 ml of tap water rapidly agitated and containing 0.5 ml of a 50 weight percent aqueous TMAC. After hydrating for about 30 minutes, the pH was adjusted to about 5.1 with glacial acetic acid. Afterward, with good agitation, 0.50 ml of a zirconium lactate based crosslinking agent (8.5% $ZrO_2$) was added. Gelation occurred in about 60 seconds. The fluid was evaluated using the Fann 50C rheometer as described in Example 1 except that the test temperature was about 150° F. (65° C.). The pump time for this 15 ppt polymer loading was in excess of 7 hours. The fluid obtained a viscosity of about 380 cps at 105 $s^{-1}$ at test temperature (n' of about 0.515 and K' of about 36 dynes/cm2) and after seven hours maintained 360 cps at 105 $s^{-1}$ (n' of about 0.524 and K' of about 33 dynes/cm2).

EXAMPLE 7

A fracturing fluid having a high concentration of conventional CMHPG was tested to compare with Example 1 above. The conventional fluid was prepared by adding 2.4 grams (40 ppt) of conventional CMHPG to 500 ml of tap water rapidly agitated and containing 0.5 ml of a 50 weight percent aqueous TMAC. After hydrating for about 30 minutes, the pH was adjusted to about 4.8 with glacial acetic acid. Afterward, with good agitation, 0.35 ml of a zirconium lactate crosslinking agent (8.5% ZrO2) was added. Gelation occurred in about 40 seconds.

The fluid was tested in accordance with Example 1. The conventional fluid retained a viscosity of 245 cps at 105 $s^{-1}$ after about 90 minutes and 162 cps at 105 $s^{-1}$ after about 118 minutes. The fluid of the present invention, using half as much polymer, surprisingly retained about the same viscosity (232 cps at 105 $s^{-1}$ after about 90 minutes and 145 cps at 105 $s^{-1}$ after about 124 minutes).

EXAMPLE 8

A fracturing fluid having a low concentration of conventional CMHPG was tested to compare with the invention described in Example 3. The fracturing fluid was prepared by adding 0.9 grams (15 ppt) of conventional CMHPG to 50 ml of tap water, rapidly agitated and containing 0.5 ml of a 50 weight percent aqueous TMAC. After hydrating for about 30 minutes, the pH was adjusted to about 4.5 with glacial acetic acid. Afterward, with good agitation, 0.25 ml of a zirconium lactate crosslinking agent (8.5% ZrO2) was added. Gelation occurred in about 90 seconds.

The gel was evaluated in accordance with Example 3. This conventional system provided only about one and one half hours of stability as compared to over 16 hours for the high yielding CMHPG of Example 3. The conventional fracturing fluid achieved an initial viscosity of 305 cps at 105 $s^{-1}$ which rapidly decreased to 110 cps in one hour and dropped below 100 cps after 2 hours.

EXAMPLE 9

In this experiment, the fracturing fluid pH was elevated to exceed 110.0. This is to show applicability in high pH environments. The fluid was prepared by adding 0.9 grams of the CMG used in Example 6 to 500 ml of tap water rapidly agitated and containing 0.5 ml of a 50 weight percent aqueous TMAC solution. After hydrating for 30 minutes, the solution's Fann 35 viscosity was 11.5 cp at 511 $s^{-1}$. The pH was adjusted 11.40 with 0.25 ml 46 weight percent aqueous potassium hydroxide. Afterward, with good agitation, 0.25 ml of a zirconium lactate based crosslinking agent (8.5% $ZrO_2$) was added. Gelation occurred in about 15 seconds. The fluid was evaluated using the Fann 50C viscometer as described in Example 1 except that the test temperature was about 150° F. (65° C.). The pump time for this 15 ppt polymer laden fluid exceeded 4 hours. The fluid obtained a viscosity of 686 cps at 105 $s^{-1}$ at test temperature (n': 0.866 and K': 12.8 dynes/cm 2) and declined to 618 cps at 105 $s^{-1}$ (n': 0.685 and K': 26.78 dynes/$cm^2$) after about 4 hours at temperature.

EXAMPLE 10

In this experiment, the fracturing fluid pH was elevated to exceed 11.0. This is to show applicability in higher temperatures and pH environments. The fluid was prepared by adding 0.9 grams of the CMG used in Example 6 to 500 ml of tap water rapidly agitated and containing 0.5 ml of a 50 weight percent aqueous TMAC solution and 0.6 grams of sodium thiosulfate. After hydrating for 30 minutes, the solution's Fann 35 viscosity was 11.5 cp at 511 $s^{-1}$. The pH was adjusted to 11.35 with 0.25 ml 46% aqueous potassium hydroxide. Afterward, with good agitation, 0.25 ml of a zirconium lactate based crosslinking agent (8.5% $ZrO_2$) was added. Gelation occurred in about 15 seconds. The fluid was evaluated using the Fann 50C viscometer as described in Example 1 except that the test temperature was about 230° F. (110° C.). The pump time for this 15 ppt polymer laden fluid exceeded 4 hours. The fluid obtained a viscosity of 645 cps at 105 $s^{-1}$ at test temperature (n': 1.091 and K': 4.225 dynes/$cm^2$) and declined to 270 cps at 105 $s^{-1}$ (n': 0.669 and K': 12.588 dynes/$cm^2$) after about 4 hours at temperature.

What is claimed is:

1. A method of fracturing a subterranean formation, comprising:
    forming a base fluid by blending together water and a carboxylated guar polymer, maintaining said base fluid substantially free from cation producing additives that interfere with the anionic groups of said carboxylated guar polymer;
    adding a crosslinking agent to the base fluid to form a gel; and
    injecting the gel into at least a portion of the subterranean formation at high pressure to form fractures within the formation;
    wherein a test gel of the carboxylated guar polymer maintains a viscosity of at least 360 cps at 105 $s^{-1}$, after viscosity testing maintained for seven hours at a shear rate of 105 $s^{-1}$ and a temperature of 150° F.; and wherein said test gel is prepared by adding 0.9 gram of said carboxylated guar polymer to 500 ml of water containing 0.5ml of a 50 weight percent aqueous TMAC solution; rapidly agitating the water, carboxylated guar polymer and TMAC for 30 minutes; adjusting the pH to 5.1 with glacial acetic acid; and then adding 0.50 ml of a zirconium lactate based crosslinking agent, which has a zirconium concentration measured and reported as the oxide of 8.5 weight percent $ZrO_2$, with good agitation until gelation occurs.

2. The method of claim 1, wherein the concentration of the carboxylated guar polymer in the base fluid is about 20 pounds or less per 1,000 gallons.

3. The method of claim 1, wherein the concentration of the carboxylated guar polymer in the base fluid is about 15 pounds or less per 1,000 gallons.

4. The method of claim 1, wherein the concentration of the carboxylated guar polymer in the base fluid is about 10 pounds or less per 1,000 gallons.

5. The method of claim 1, wherein the carboxylated guar polymer comprises carboxymethyl guar.

6. The method of claim 1, wherein the carboxylated guar polymer comprises carboxymethylhydroxypropyl guar.

7. The method of claim 1, wherein the pH of the gel is between about 3.5 and about 12.

8. The method of claim 1, wherein the crosslinking agent comprises a zirconium compound.

9. The method of claim 8, wherein the zirconium compound comprises a member selected from the group consisting of zirconium lactate, zirconium glycolate, and zirconium lactate triethanloamine.

10. The method of claim 1, wherein the method of forming a base fluid further comprises adding a tetramethylammonium halide.

11. The method of claim 10, wherein the tetramethylanimonium halide comprises tetramethylanimonium chloride.

12. A method of fracturing a subterranean formation, comprising:
forming a base fluid by blending together water and a carboxylated guar polymer, maintaining said base fluid substantially free from cation producing additives that interfere with the anionic groups of said carboxylated guar polymer;
adding a crosslinking agent to the base fluid to form a gel; and
injecting the gel into at least a portion of the subterranean formation at high pressure to form fractures within the formation;
wherein a test gel of the carboxylated guar polymer maintains a viscosity of at least 618 cps at 105 s$^{-1}$ after viscosity testing maintained for four hours at a shear rate of 105 s$^{-1}$ and a temperature of 150° F.; and wherein said test gel is prepared by adding 0.9 gram of said carboxylated guar polymer to 500 ml of water containing 0.5 ml of a 50 weight percent aqueous TMAC solution; rapidly agitating the water, carboxylated guar polymer and TMAC for 30 minutes; adjusting the pH to 11.4 with 46 weight percent aqueous potassium hydroxide; and then adding 0.25 ml of a zirconium lactate based crosslinking agent, which has a zirconium concentration measured and reported as the oxide of 8.5 weight percent $ZrO_2$, with good agitation until gelation occurs.

13. The method of claim 12, wherein the concentration of the carboxylated guar polymer in the base fluid is about 20 pounds or less per 1,000 gallons.

14. The method of claim 12, wherein the concentration of the carboxylated guar polymer in the base fluid is about 15 pounds or less per 1,000 gallons.

15. The method of claim 12, wherein the concentration of the carboxylated guar polymer in the base fluid is about 10 pounds or less per 1,000 gallons.

16. The method of claim 12, wherein the carboxylated guar polymer comprises carboxymethyl guar.

17. The method of claim 12, wherein the carboxylated guar polymer comprises carboxymethylhydroxypropyl guar.

18. The method of claim 12, wherein the pH of the gel is between about 3.5 and about 12.

19. The method of claim 12, wherein the crosslinking agent in the gel comprises a zirconium compound.

20. The method of claim 19, wherein the zirconium compound comprises a member selected from the group consisting of zirconium lactate, zirconium glycolate, and zirconium lactate triethanloamine.

21. The method of claim 12, wherein the method of forming a base fluid further comprises adding a tetramethylammonium halide.

22. The method of claim 21, wherein the tetramethylammonium halide comprises tetramethylammonium chloride.

23. A method of fracturing a subterranean formation, comprising:
forming a base fluid by blending together water and a carboxylated guar polymer, maintaining said base fluid substantially free from cation producing additives that interfere with the anionic groups of said carboxylated guar polymer;
adding a crosslinking agent to the base fluid to form a gel; and
injecting the gel into at least a portion of the subterranean formation at high pressure to form fractures within the formation;
wherein a test gel of the carboxylated guar polymer maintains a viscosity of at least 270 cps at 105 s$^{-1}$, after viscosity testing maintained for four hours at a shear rate of 105 s$^{-1}$ and a temperature of 230° F.; and wherein said test gel is prepared by adding 0.9 gram of said carboxylated guar polymer to 500 ml of water containing 0.5 ml of a 50 weight percent aqueous TMAC solution and 0.6 grams of sodium thiosulfate; rapidly agitating the water, carboxylated guar polymer and TMAC for 30 minutes; adjusting the pH to 11.35 with 46 weight percent aqueous potassium hydroxide; and then adding 0.25 ml of a zirconium lactate based crosslinking agent, which has a zirconium concentration measured and reported as the oxide of 8.5 weight percent $ZrO_2$, with good agitation until gelation occurs.

24. The method of claim 23, wherein the concentration of the carboxylated guar polymer in the base fluid is about 20 pounds or less per 1,000 gallons.

25. The method of claim 23, wherein the concentration of the carboxylated guar polymer in the base fluid is about 15 pounds or less per 1,000 gallons.

26. The method of claim 23, wherein the concentration of the carboxylated guar polymer in the base fluid is about 10 pounds or less per 1,000 gallons.

27. The method of claim 23, wherein the carboxylated guar polymer comprises carboxymethyl guar.

28. The method of claim 23, wherein the carboxylated guar polymer comprises carboxymethylhydroxypropyl guar.

29. The method of claim 23, wherein the pH of the gel is between about 3.5 and about 12.

30. The method of claim 23, wherein the crosslinking agent comprises a zirconium compound.

31. The method of claim 30, wherein the zirconium compound comprises a member selected from the group consisting of zirconium lactate, zirconium glycolate, and zirconium lactate triethanloamine.

32. The method of claim 23, wherein the method of forming a base fluid further comprises adding a tetramethylammonium halide.

33. The method of claim 32, wherein the tetramethylammonium halide comprises tetramethylammonium chloride.

* * * * *